(12) United States Patent
Gaertner et al.

(10) Patent No.: US 7,490,261 B2
(45) Date of Patent: Feb. 10, 2009

(54) BACKGROUND MEDIA SCAN FOR RECOVERY OF DATA ERRORS

(75) Inventors: Mark Gaertner, Vadnais Heights, MN (US); Xiaoying Li, Shakopee, MN (US); David A. Anderson, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 641 days.

(21) Appl. No.: 10/740,886

(22) Filed: Dec. 18, 2003

(65) Prior Publication Data

US 2005/0188238 A1    Aug. 25, 2005

(51) Int. Cl.
*G06F 11/00* (2006.01)

(52) U.S. Cl. .......................................... 714/8
(58) Field of Classification Search ............... 714/8, 714/723, 769
See application file for complete search history.

(56) References Cited

U.S. PATENT DOCUMENTS

| | | | |
|---|---|---|---|
| 5,189,566 A | 2/1993 | Christensen | |
| 5,729,552 A * | 3/1998 | Yorimitsu | 714/718 |
| 5,872,800 A * | 2/1999 | Glover et al. | 714/766 |
| 6,034,831 A * | 3/2000 | Dobbek et al. | 360/53 |
| 6,043,945 A * | 3/2000 | Tsuboi et al. | 360/53 |
| 6,052,804 A | 4/2000 | Thowe | |
| 6,118,608 A | 9/2000 | Kakihara | |
| 6,289,483 B1 * | 9/2001 | Ohtaki | 714/769 |
| 6,304,986 B1 * | 10/2001 | Ma et al. | 714/718 |
| 6,327,679 B1 | 12/2001 | Russell | |
| 6,332,204 B1 | 12/2001 | Russell | |
| 6,408,408 B1 * | 6/2002 | Ko | 714/710 |
| 6,412,089 B1 * | 6/2002 | Lenny et al. | 714/769 |
| 6,426,928 B1 | 7/2002 | Russell | |
| 6,467,054 B1 * | 10/2002 | Lenny | 714/42 |
| 6,469,854 B1 | 10/2002 | Gill | |
| 6,606,210 B1 | 8/2003 | Coker | |
| 6,633,834 B2 * | 10/2003 | Conrad et al. | 702/188 |
| 2002/0154433 A1 | 10/2002 | Gill | |
| 2002/0169996 A1 * | 11/2002 | King et al. | 714/8 |
| 2004/0052045 A1 * | 3/2004 | Botchek | 361/685 |
| 2005/0188238 A1 * | 8/2005 | Gaertner et al. | 714/2 |

* cited by examiner

*Primary Examiner*—Bryce P Bonzo
(74) *Attorney, Agent, or Firm*—Leanne Taveggia Farrell; Westman, Champlin & Kelly, P.A.

(57) ABSTRACT

The present invention is a method of recovering data in a system that stores data in identifiable storage segments. The method includes scanning at least one storage segment for a read error. The method also includes performing a read recovery operation in an attempt to recover a read error. The method logs recovered read errors as a function of the read recovery operation.

21 Claims, 10 Drawing Sheets

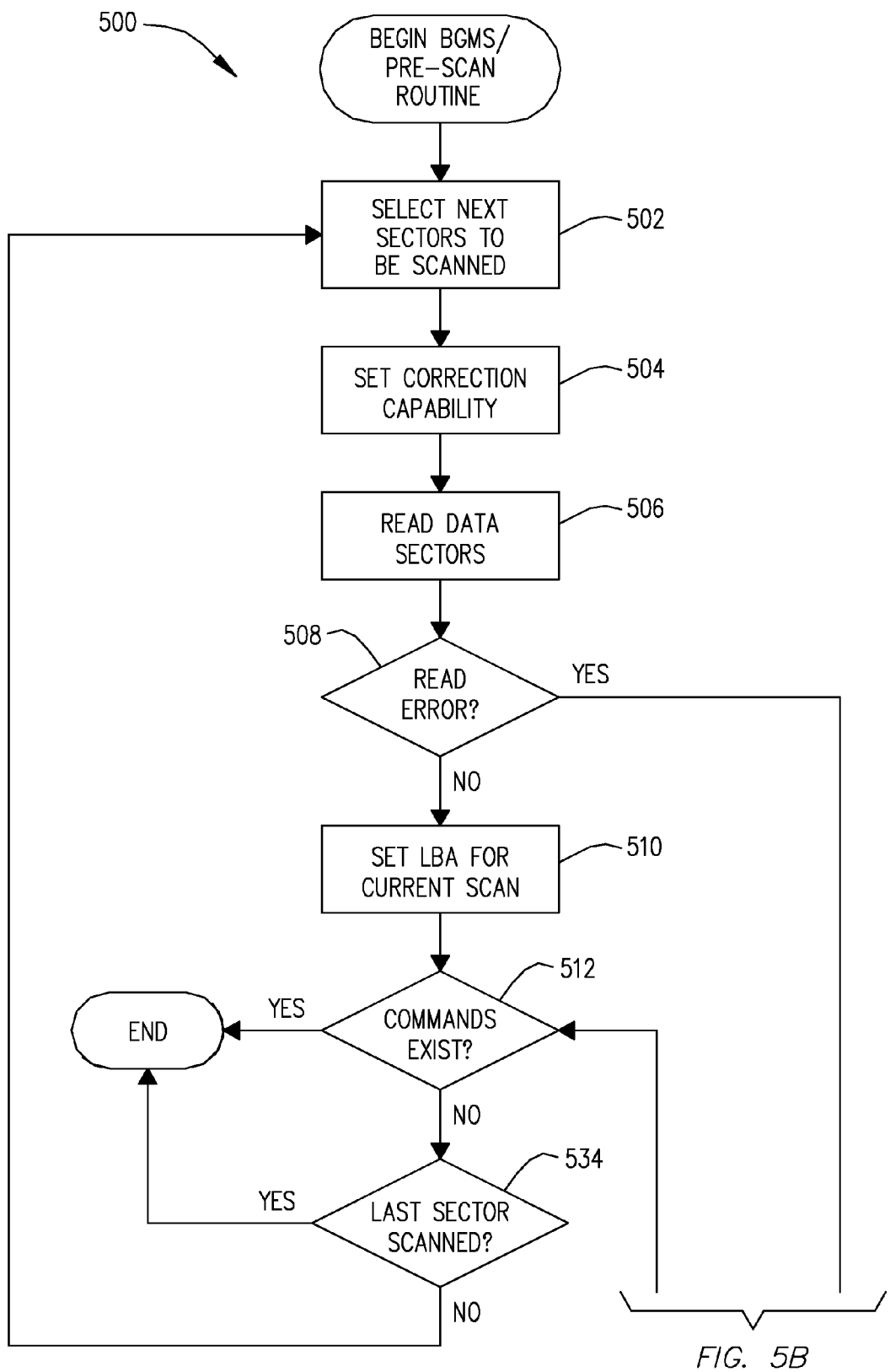

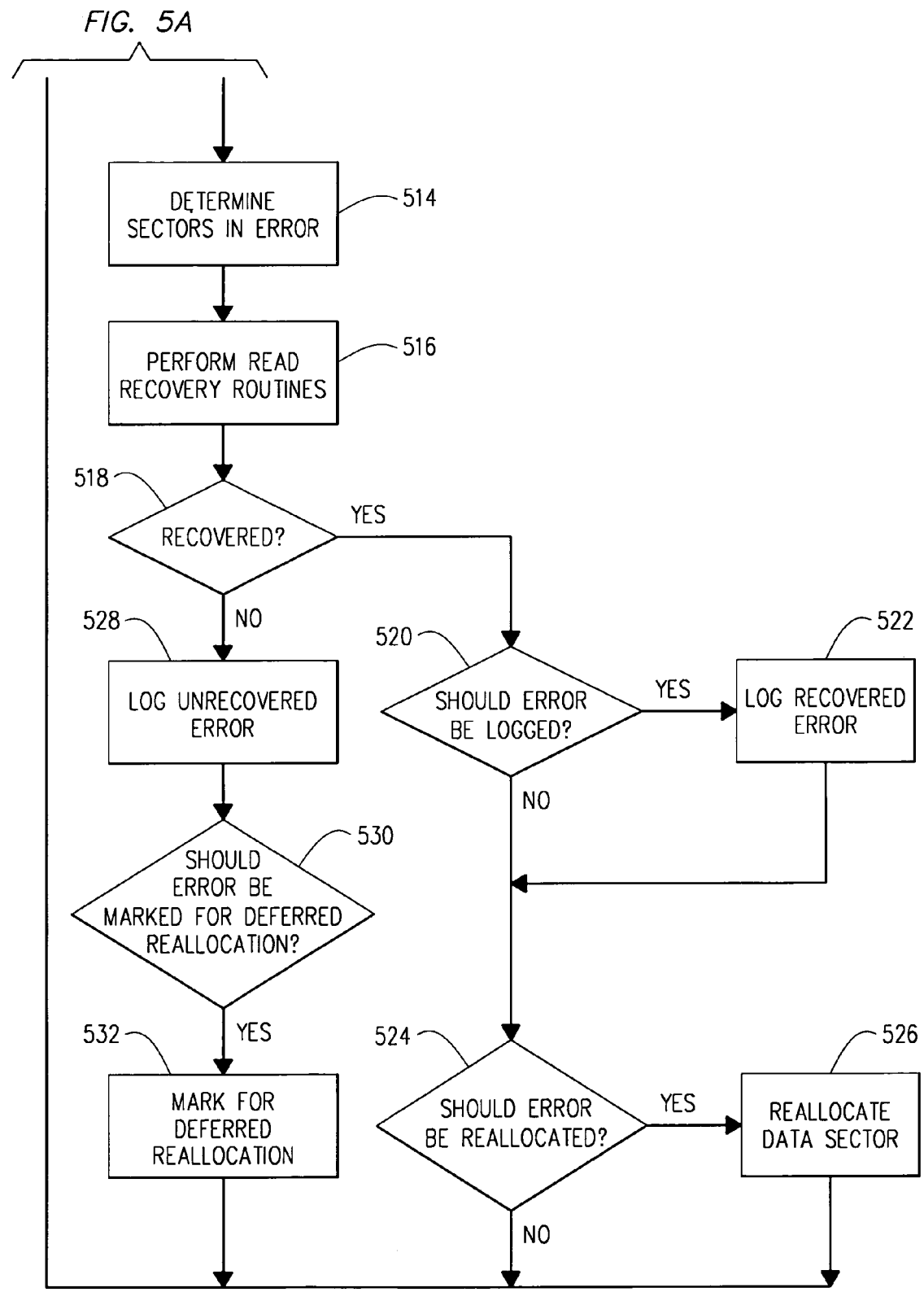

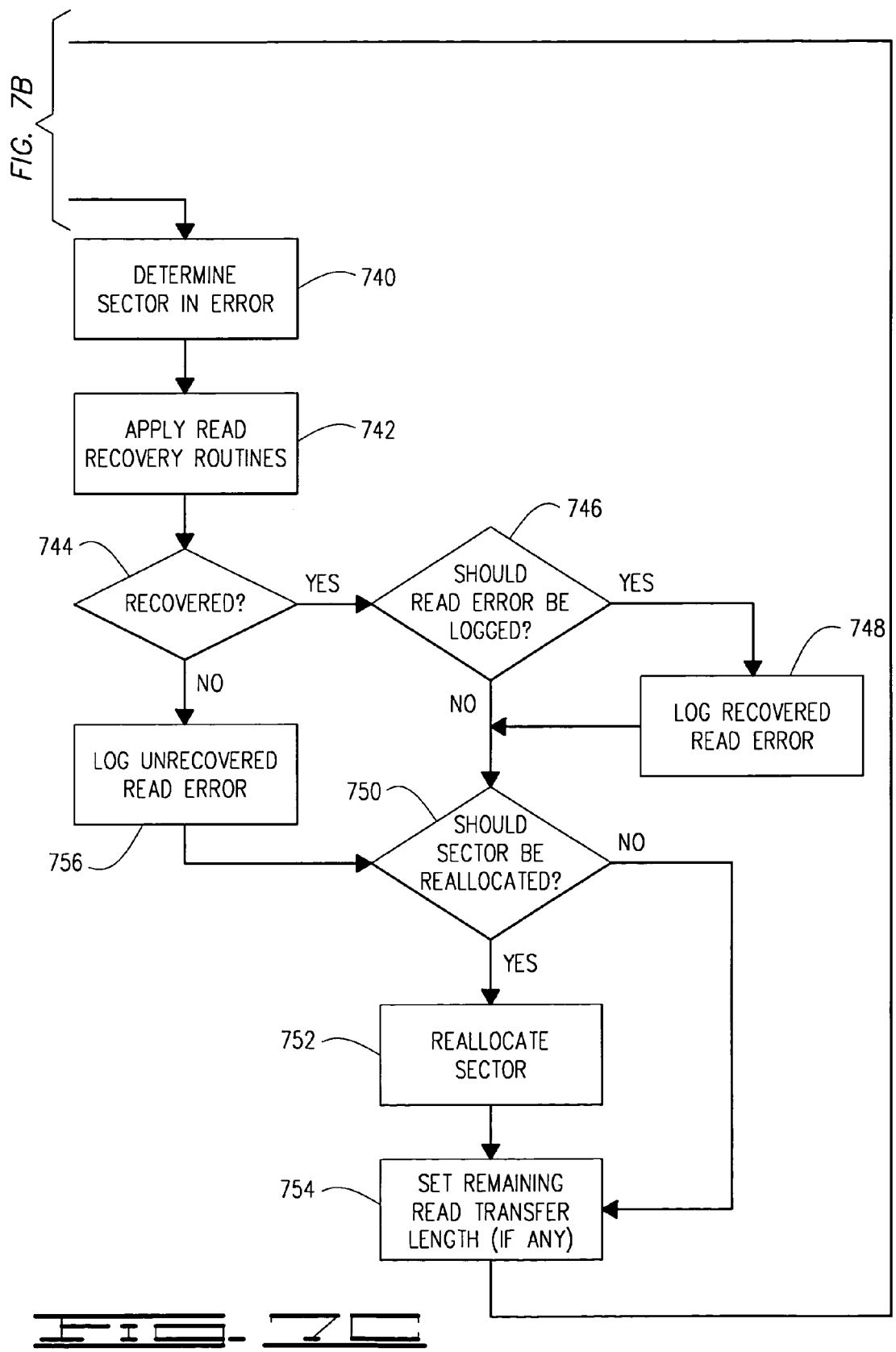

BACKGROUND MEDIA SCAN FOR RECOVERY OF DATA ERRORS

FIELD OF THE INVENTION

The present invention relates generally to the field of data storage systems. In particular, the present invention relates to proactively recovering data in a data storage system.

BACKGROUND OF THE INVENTION

Data storage systems, such as disc drives, typically store information on surfaces of storage media such as magnetic or optical discs. In a typical disc drive, a number of discs are mounted together on a spindle to form a disc stack. The spindle causes the discs to spin and the data surfaces of the disc to pass under respective hydrodynamic and aerodynamic bearing disc head sliders. These head sliders are typically mounted on an actuator arm that moves the head sliders in tandem over the disc surfaces such that all of the head sliders are at the same approximate disc radius at the same time.

When information is stored on a disc it is generally stored in a set of concentric data tracks. The tracks on the disc surface are typically divided into data sectors. Data sectors are the basic units of data storage on a disc surface. A sector is a "pie-shaped" angular section of a track that is bounded on two sides by radii of the disc and on the other side by the perimeter of the circle that defines the track. In other words, the sector is a small storage segment along the length of a track.

Most tracks are available for read/write access by the host computer. These tracks contain user data. Data sectors which contain drive unique information are stored in reserved sectors which are not normally accessible by the host computer. Additionally, a certain number of spare sectors are included in the disc stack. These sectors may be utilized as replacement sectors for any defective sectors in user data as well as the reserved sectors.

Some defective sectors are formed at the time of disc manufacture. However, defects can arise in any of the sectors at various times during the lifetime of the storage system (grown defects). Grown defects include, for example, invading foreign particles which become embedded onto the surface of the disc, or external shocks to the storage system which can cause the transducer to nick or crash onto the surface of the disc. Defective sectors pose either temporary or permanent data retrieval problems.

Read errors are typically determined when the host computer attempts to retrieve user data from a sector and one or more uncorrected errors exist. Typically, the data storage system includes internally programmed error recovery routines such that upon determination of a read error, the data storage system applies a variety of corrective operations to recover user data. Occasionally, the data storage system exhausts all available corrective operations for recovery of data without success. The data storage system will declare a hard error and reallocate the sector by mapping out the bad sector and substituting an unused, reserved sector. The use of these corrective operations and reallocation functions can require a significant amount of time during retrieval of user data and thus, limit the maximum data transfer rate of the data storage system.

Embodiments of the present invention provide solutions to these and other problems, and offer other advantages over the prior art.

SUMMARY OF THE INVENTION

The present invention is a method of recovering data in a storage system that stores data in identifiable storage segments. The method includes the step of scanning at least one storage segment for a read error. The method also includes the step of performing a read recovery operation in attempt to recover the read error. The method logs a recovered read error as a function of the read recovery operation.

Other features and benefits that characterize embodiments of the present invention will be apparent upon reading the following detailed description and review of the associated drawings.

BRIEF DESCRIPTION OF THE DRAWINGS

FIG. 5 is a flow chart illustrating a background media scan routine in accordance with an embodiment of the present invention.

DETAILED DESCRIPTION OF ILLUSTRATIVE EMBODIMENTS

Figure 1:
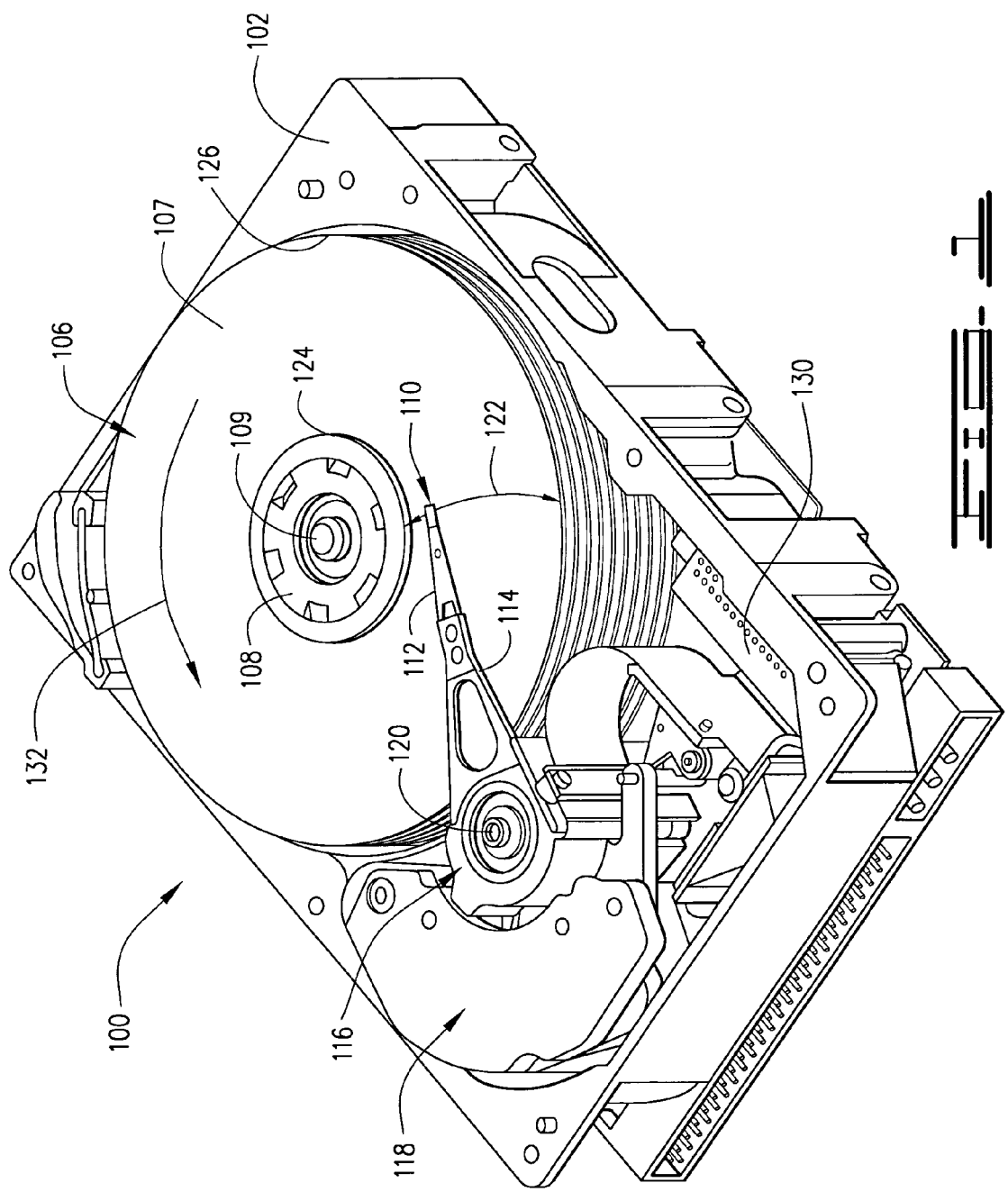
FIG. 1 is a perspective view of a disc drive.

FIG. 1 is a perspective view of disc drive 100 with which the present invention is useful. Disc drives are common data storage systems. Disc drive 100 includes a housing with a base deck 102 and top cover (not shown). Disc drive 100 further includes media 106, which is mounted on a spindle motor (not shown in FIG. 1) by a disc clamp 108. Media 106 can include one or more discs and is illustrated with a plurality of individual discs 107, which are mounted for co-rotation about axis 109 in a direction indicated by arrow 132. Each disc surface has an associated slider 110 which carries a read/write head for communication with the disc surface. In FIG. 1, sliders 110 are supported by suspension 112 which is in turn attached to track accessing arm 114 of an actuator mechanism 116. Actuator mechanism 116 is of the type known as a rotary moving coil actuator and includes a voice coil motor (VCM), shown generally at 118. VCM 118 rotates actuator 116 about pivot shaft 120 to position sliders 110 over a desired data track along an arcuate path 122 between a disc inner diameter 124 and a disc outer diameter 126. VCM 118 is driven by electronic circuitry 130 based on signals generated by the read/write heads and a host computer (not shown).

Figure 2:
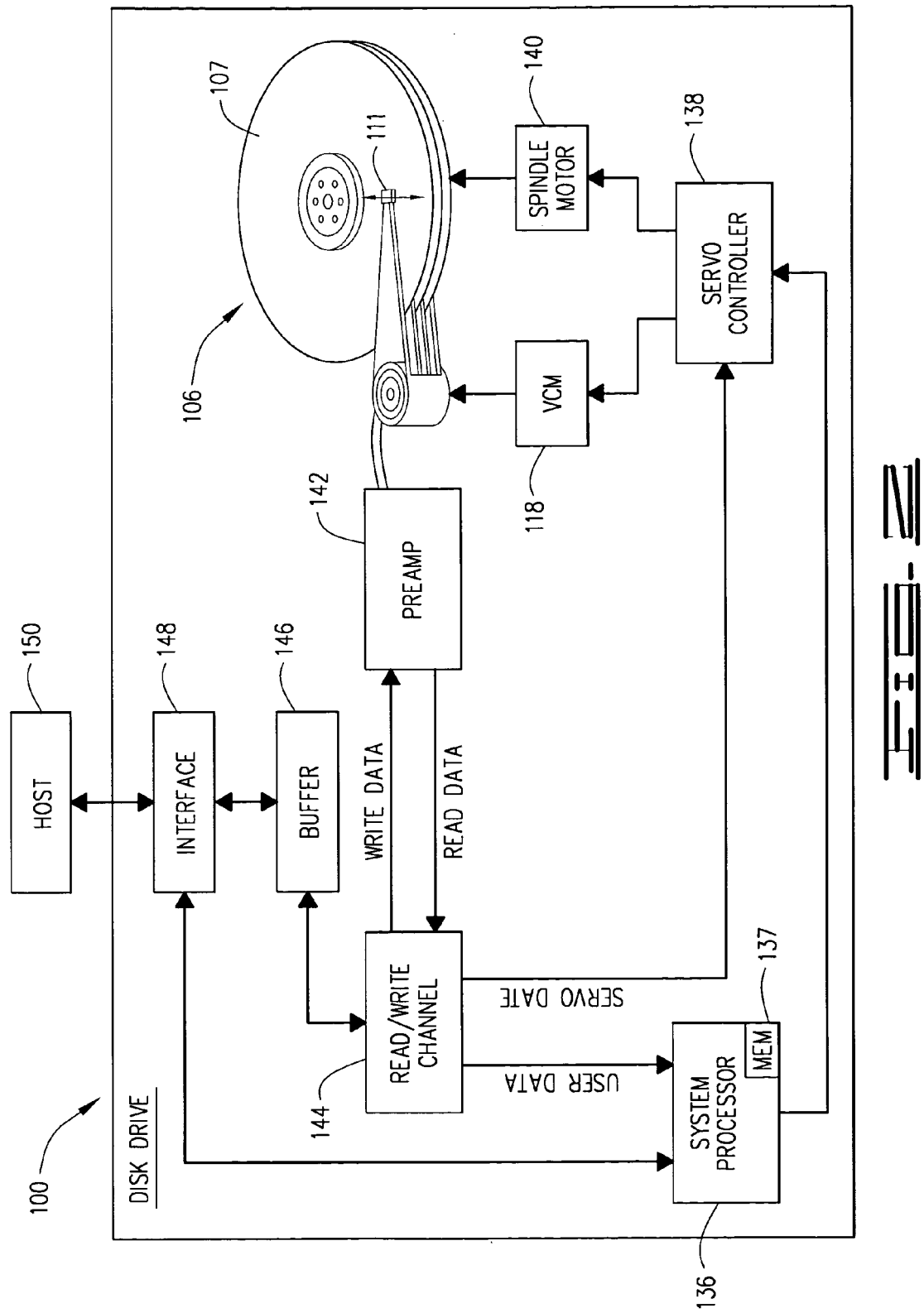
FIG. 2 is a simplified block diagram of the disc drive in FIG. 1 in accordance with an embodiment of the present invention.

FIG. 2 is a simplified block diagram of disc drive 100 in accordance with an embodiment of the present invention. As previously discussed in FIG. 1, media 106 includes a plurality of discs 107. Each disc 107 has a plurality of substantially concentric circular tracks. Each track is subdivided into a plurality of storage segments. As defined herein, a storage segment is the basic unit of data storage in media 106. Each storage segment is identified and located at various positions on media 106. As related to FIG. 2, storage segments or data sectors are "pie-shaped" angular sections of a track that are bounded on two sides by radii of the disc and on the other side by the perimeter of the circle that defines track. Each track has related linear block addressing (LBA). LBA includes a cylinder address, head address and sector address. A cylinder identifies a set of specific tracks on the disc surfaces to each disc 107 which lie at equal radii and are generally simultaneously accessible by the collection of heads 111. The head address identifies which head can read the data and therefore identifies which disc from the plurality of discs 107 the data is located. As mentioned above, each track within a cylinder is further divided into sectors for storing data and servo information. The data sector is identified by an associated sector address.

Disc drive 100 includes system processor 136, which is used for controlling certain operations of disc drive 100 in a known manner. In accordance with the present invention, system processor 136 is also used for carrying out data recovery of flawed data sectors. The various operations of disc drive 100 are controlled by system processor 136 with the use of programming stored in memory 137. Disc drive 100 also includes servo controller 138 which generates control signals applied to VCM 118 and spindle motor 140. System processor 136 instructs servo controller 138 to seek head 111 to desired tracks. Servo controller 138 is also responsive to servo data, such as servo burst information recorded on disc 107 in embedded servo fields included in the data sectors.

Disc drive 100 further includes preamplifier (preamp) 142 for generating a write signal applied to head 111 during a write operation, and for amplifying a read signal emanating from head 111 during a read operation. A read/write channel 144 receives data from system processor 106 during a write operation, and provides encoded write data to preamplifier 142. During a read operation, read/write channel 146 processes a read signal generated by preamp 142 in order to detect and decode data recorded on disc 107. The decoded data is provided to system processor 136 and ultimately through interface 148 to host computer 150.

As discussed below in FIGS. 4 and 5, system processor 136 sequentially performs a background media scan (BGMS) of the complete available range of LBAs of media 106 for read errors without any intervention from host computer 150. Thus, disc drive 100 proactively finds media errors before the system writes to a location of media 106. Upon finding a read error, system processor 136 performs a read recovery operation. The read recovery operation includes a series of corrective routines stored in memory 137 in an attempt to correct read errors. After performance of the read recovery operation, system processor 136 logs recovered read errors as a function of the read recovery operation and logs unrecovered read errors if the attempt to recover the read error fails. As will be discussed in FIGS. 6 and 7, the first scan of the media upon power-up of disc drive 100 is called a pre-scan. Under the pre-scan, disc drive 100 scans, corrects and logs errors in accordance with the BGMS. However, if a WRITE command is issued from host computer 150 during the pre-scan to a data sector that has not yet been pre-scanned, then system processor 136 converts the WRITE command to a WRITE AND VERIFY command. The WRITE AND VERIFY command corrects and logs write errors during the write process as well as reads back the written data to verify that no read errors exist. If read errors are discovered during the verify portion of the WRITE AND VERIFY command, then the read errors are recovered and logged as a function of the recovery. After system processor 136 has pre-scanned the entire available range of LBAs, the pre-scan is disabled. Although the BGMS and the pre-scan are both self-initiated by disc drive 100 while in operation, the BGMS and the pre-scan can be enabled and disabled upon user control via host computer 150.

Figure 3:
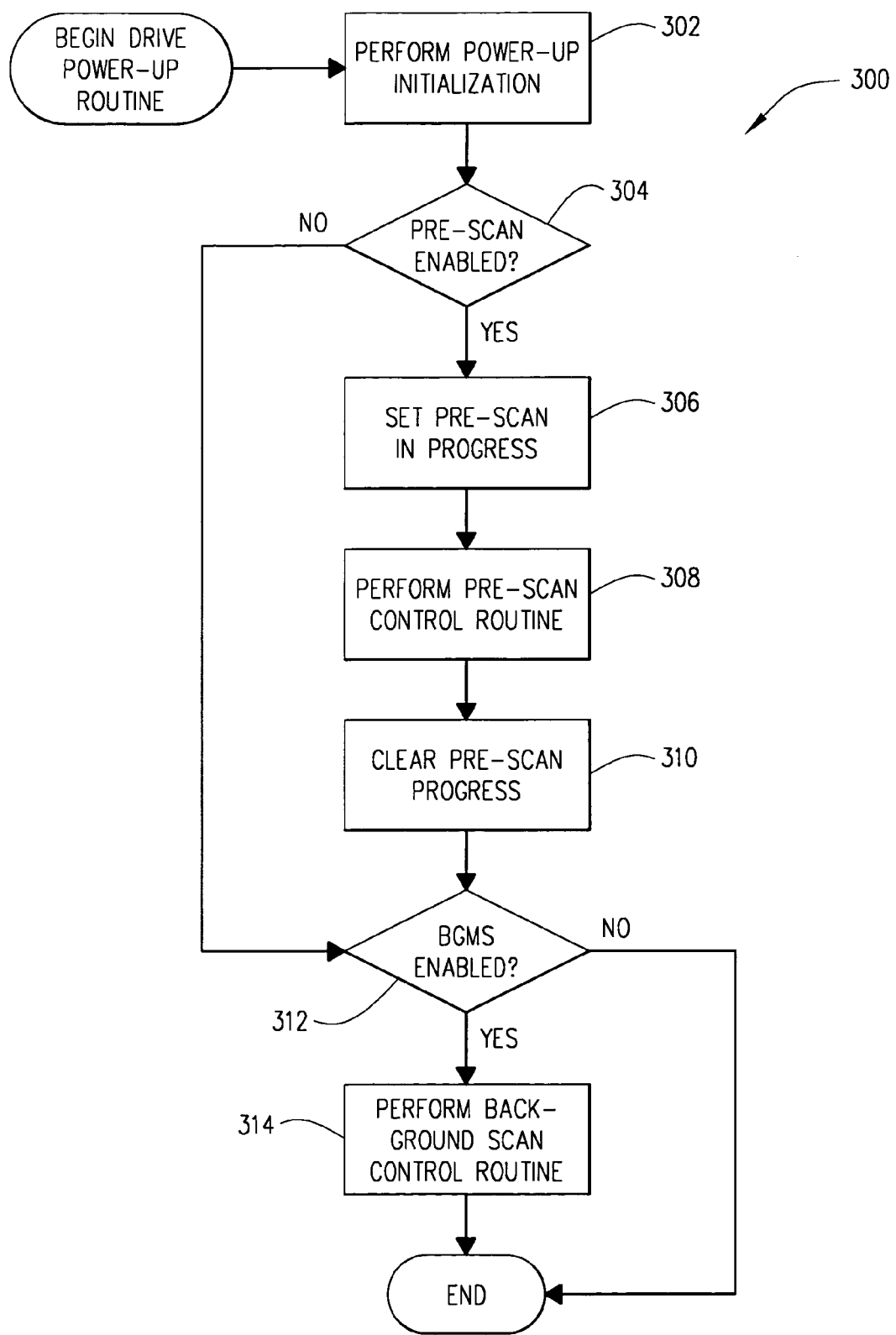
FIG. 3 is a flow chart of a disc drive power up routine in accordance with an embodiment of the present invention.

FIG. 3 is a generalized flowchart 300 of a disc drive power-up routine as implemented by system processor 136 (FIG. 2) in accordance with an embodiment of the present invention. Upon power-up of disc drive 100 (FIG. 2), system processor 136 proceeds to perform a power-up initialization as illustrated in process block 302. The power-up routine then proceeds to decision block 304 where system processor 136 determines whether the pre-scan is enabled. If the pre-scan is enabled, the power-up routine proceeds to process block 306. If the pre-scan is disabled, the power-up routine proceeds to decision block 312. At block 306, the power-up routine sets the pre-scan as "in progress." Then, the power-up routine proceeds to process block 308 to perform or "call up" the pre-scan control routine from memory 137 (FIG. 2). The pre-scan control routine is described below in connection with FIG. 6. After the pre-scan control routine has been completed, the power-up routine proceeds to process block 310 and clears the pre-scan progress. Specifically, process block 306 flags the pre-scan function as being in progress while process block 310 flags the pre-scan function as not in progress. The power-up routine then proceeds to decision block 312.

At block 312, system processor 136 determines whether the BGMS is enabled. If the BGMS is enabled, the power-up routine proceeds to process block 314. If the BGMS is disabled, the power-up routine terminates. At process block 314, system processor 136 proceeds to perform or "call up" the BGMS control routine from memory 137. The BGMS control routine is described below in connection with FIG. 4. If the BGMS control routine should terminate, the power-up routine terminates as well. For example, if a fatal error is found during the BGMS control routine, both the BGMS control routine and the power-up routine will terminate.

Figure 4:
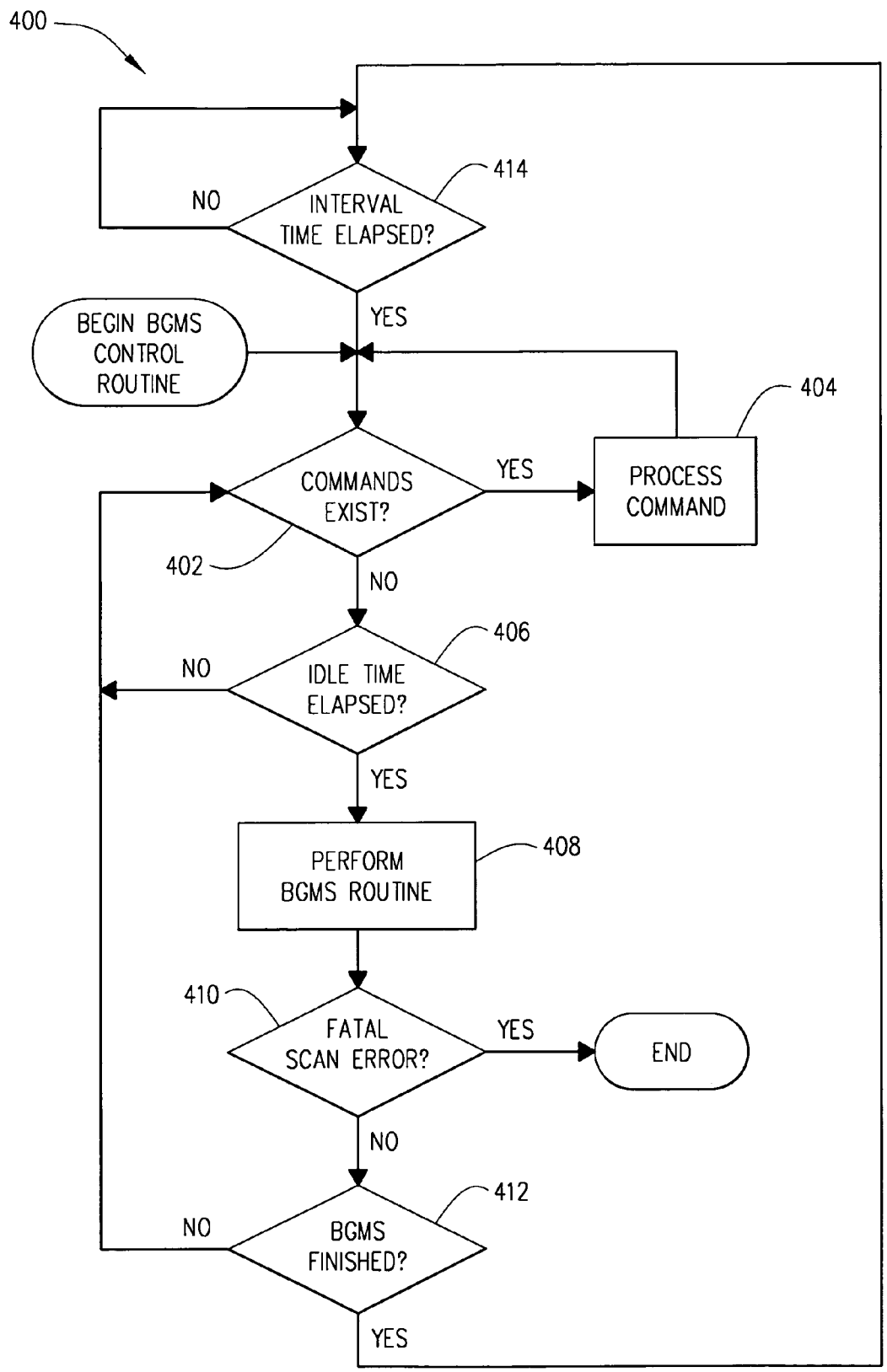
FIG. 4 is a flow chart illustrating a background media scan control routine in accordance with an embodiment of the present invention.

FIG. 4 is a generalized flowchart 400 illustrating the BGMS control routine as implemented by system processor 136 (FIG. 2) in accordance with an embodiment of the present invention. In general, the BGMS control routine is a process with which system processor 136 determines whether disc drive 100 (FIG. 2) is ready to scan the data sectors in media 106 for read errors. The BGMS will only scan data sectors if certain criteria have been met. In one embodiment, commands issued from host computer 150 (FIG. 2) to complete an activity can not exist. In another embodiment, a predetermined amount of idle time (amount of time in which disc drive 100 was last active) has elapsed. In yet another embodiment, a predetermined amount of interval time (amount of time in which disc drive 100 has last completed a BGMS) has elapsed.

Upon system processor 136 "calling" the BGMS control routine from the power-up routine (described in FIG. 3), the BGMS control routine begins and proceeds to decision block 402 to determine whether any commands were issued from host computer 150 (FIG. 2). If a command or set of commands have issued, the BGMS control routine proceeds to process block 404 and system processor 136 processes the commands. If a command has not been issued, then the BGMS control routine proceeds to decision block 406 and system processor 136 determines whether the predetermined amount of idle time has elapsed. For example, the predetermined idle time can be 500 milliseconds. Those skilled in the art will recognize, however, that this value can be a wide range of values. The predetermined idle time can be a default value as well as user selectable. If the requisite amount of idle time has not elapsed, then the BGMS control routine passes back to decision block 402 and system processor 136 again determines whether any commands were issued from host computer 150. If the requisite amount of idle time has elapsed, then the BGMS control routine proceeds to process block 408 where system processor 136 performs or "calls" the BGMS routine. A detailed discussion relating to the BGMS routine is found below in connection with FIG. 5.

When the BGMS routine terminates, the BGMS control routine proceeds to decision block 410 to determine if a fatal scan error has occurred. In one example, if a predetermined amount of consecutive unrecovered errors occur, such as ten consecutive unrecovered errors, then system processor 136 determines that a fatal error has occurred and will cause the BGMS control routine to terminate. In another example, if a single occurrence of detected error is interpreted as severe hardware or system problems, such as the inability to seek, then a fatal error has occurred and will cause the BGMS control routine to end. If no fatal errors have occurred, the BGMS control routine proceeds to decision block 412 to determine whether the BGMS routine has finished. If the BGMS routine has not finished, then the BGMS control routine passes back to decision block 402. Otherwise, if the BGMS routine has finished, then the BGMS control routine proceeds to decision block 414 and determines whether a predetermined amount of interval time has elapsed. This predetermined interval time can be a wide range of default values as well as a wide range of user selectable values. For example, the predetermined interval time can be set anywhere between one hour to over seven years. Upon the requisite amount of interval time elapsing, the BGMS control routine proceeds again to decision block 402. As shown in FIG. 4, the BGMS control routine will only terminate if a fatal error occurs or disc drive 100 is shut down. In an instance when disc drive 100 is shut down, system processor 136 will proceed through the power-up routine of FIG. 3 after drive power-up. The power-up routine will determine if the BGMS is enabled. If enabled, system processor 136 will again proceed to the looping BGMS control routine.

FIG. 5 is a generalized flowchart 500 illustrating the BGMS routine as implemented by system processor 136 (FIG. 2) in accordance with an embodiment of the present invention. In general, the BGMS routine is a process with which disc drive 100 (FIG. 2) scans at least one data sector in media 106 for a read error. If system processor 136 finds a read error, system processor 136 performs a read recovery operation in an attempt to recover the read error. In addition, system processor 136 will log a recovered read error as a function of the read recovery operation.

Upon system processor 136 "calling" the BGMS routine from the BGMS control routine (described in FIG. 4), the BGMS routine begins and proceeds to process block 502 to select the data sectors to be scanned. Then, the BGMS routine proceeds to process block 504 to set the correction capability for read recovery. More specifically, system processor 136 sets the level at which a read error is detected. For example, the correction capability can include a defectiveness scale from one to ten, with level ten being the most defective. System processor 136 will set the level of correction capability such that system processor 136 will detect defective sectors at the set level and above. The corrective capability of disc drive 100 allows the scan to find marginally defective sectors and repair them such that they don't degrade to an unrecoverable error. Although the correction capability can be a defaulted value, the correction capability can also be user selectable such that finding defective sectors sooner as well as marginally defective errors sooner is possible.

Next, the BGMS routine proceeds to process block 506 and instructs read/write channel 144 (FIG. 2) to read the selected data sectors. As read/write channel 144 is reading the selected data sectors, the BGMS routine proceeds to decision block 508 to determine if an error has occurred during the read command. If a read error occurs, the BGMS routine proceeds to process block 514 to determine which data sector is in error. If an error did not occur during the read of the selected sectors, the BGMS routine proceeds to process block 510 and system processor 136 flags the LBA of the data sectors as the current LBA scanned. If a read error does occur during the read of the selected data sectors, the scan will restart at the selected set of sectors after the error has been dealt with.

After system processor 136 determines the sector in error, the BGMS routine proceeds to process block 516 and performs a read recovery operation by applying an amount of corrective routines in an attempt to recover the data sector in error. After the BGMS routine performs the read recovery operation, the BGMS routine proceeds to decision block 518 and determines if the read error has been recovered. If the read error is recovered, the BGMS routine proceeds to decision block 520. If the read error is not recovered, the BGMS routine proceeds to process block 528. At block 520, system processor 136 determines whether the recovered read error should be logged. Logging the recovered read error is a function of the read recovery operation. If an amount of corrective routines applied to recover the read error exceeds a threshold amount of routines, the BGMS routine proceeds to process block 522 and logs the recovered read error. If the amount of corrective routines is less than the threshold amount of corrective routines, the BGMS routine proceeds to decision block 524. After the recovered read error is logged, the BGMS routine also proceeds to decision block 524.

The log area is allotted a certain amount of space to record data. Upon the log filling to capacity, the log can wrap or write over previously logged information. Logging data allows disc drive 100 to handle the marginal and defective sectors in a manner it sees fit. For example, disc drive 100 can perform a reallocation of a data sector upon command. In another example, disc drive 100 can prevent use of bad sectors at a system level.

At block 524, system processor 136 determines whether the recovered read error should be reallocated. System processor 136 can take into account a variety of factors when making this decision. In one example, system processor 136 can consider the severity of the error as related to the amount of corrective routines it took to correct the error. In another example, reallocation can be user selected such that system processor 136 automatically reallocates read errors. This is called auto read reallocate enabled (ARRE). After considering the above factors and determining that the read error should be reallocated, the BGMS routine proceeds to process block 526 and reallocates the data sector to a spare sector as well as transfers the LBA of the bad sector to the spare sector by utilizing temporary storage in buffer 146 (FIG. 2). Then, the BGMS routine proceeds to decision block 512. If the error is not reallocated, the BGMS routine proceeds directly to block 512.

At block 528, system processor 136 logs the unrecovered read error if the attempt to recover the read error fails. After the unrecovered read error is logged, the BGMS routine proceeds to decision block 530 to determine if the unrecovered read error should be marked for deferred reallocation. Under deferred reallocation, the marked data sector will be reallocated at the time of the next write operation to that particular data sector. At block 530, system processor 136 checks to see if the user selected disc drive 100 to automatically reallocate the error. This is called automatic write reallocate enabled (AWRE). If the user has enabled reallocation, then the BGMS routine proceeds to process block 532 and system processor 136 marks the data sector for deferred reallocation. At the next write operation to that particular data sector, system processor 136 will proceed to reallocate the data sector to a spare sector and transfer the LBA of the bad sector to the spare sector by utilizing temporary storage in buffer 146. After the data sector has been marked for deferred reallocation, the BGMS routine proceeds to decision block 512. If the error is not marked for deferred reallocation, the BGMS routine proceeds directly to block 512.

At block 512, the BGMS routine proceeds to determine if there are any issued commands by host computer 150 (FIG. 2). If commands have been issued, the BGMS routine is interrupted and terminates. If commands have not been issued, the BGMS routine proceeds to decision block 534 to determine if the last sectors of the full range of LBAs have been scanned. If the data sectors that were previously scanned are the last of the data sectors to be scanned, the BGMS routine terminates as well. If the data sectors that were previously scanned were not the last of the data sectors to be scanned, the BGMS routine passes back to process block 502 and begins scanning the next selected data sectors.

Figure 6:
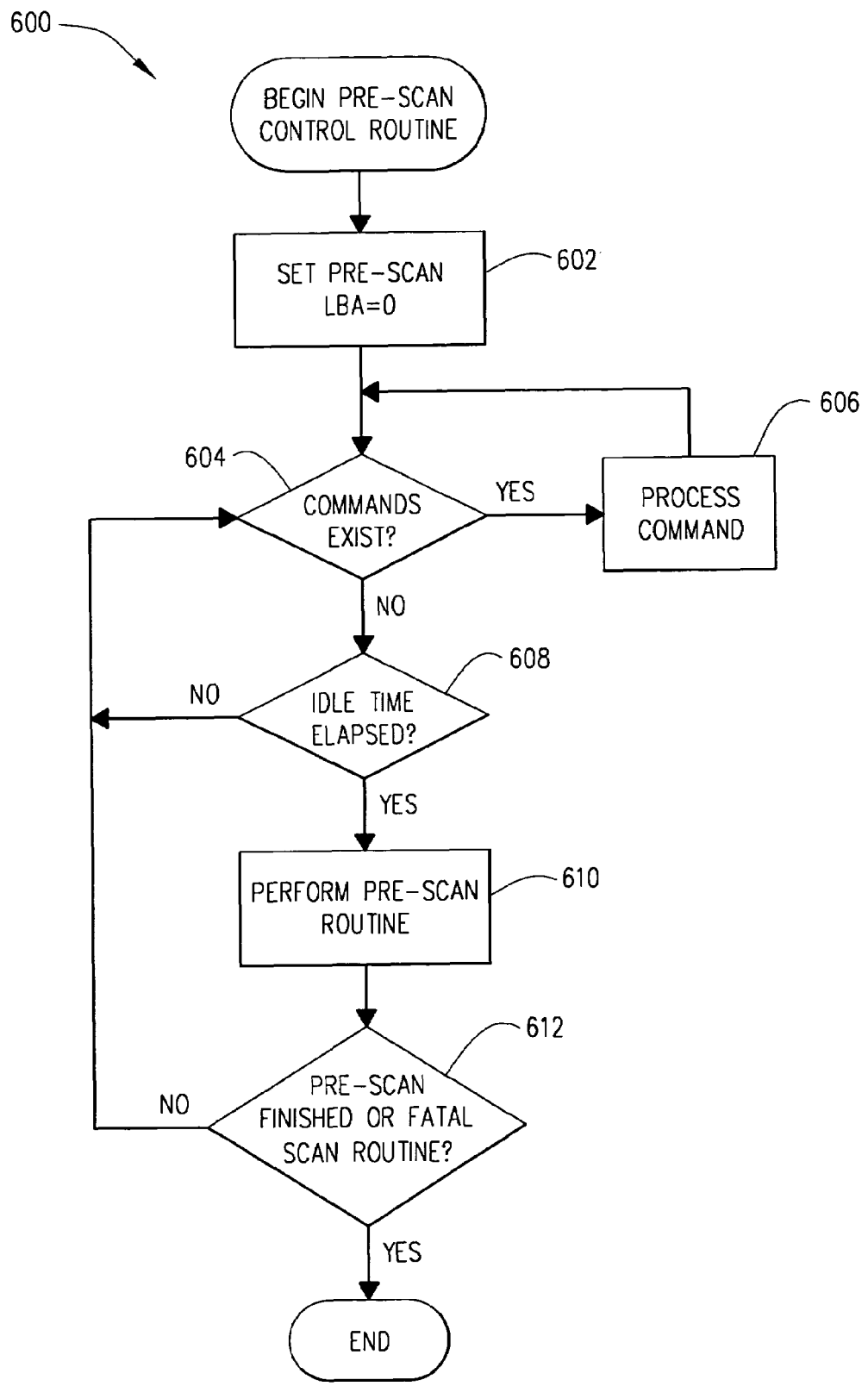
FIG. 6 is a flow chart illustrating a pre-scan control routine in accordance with an embodiment of the present invention.

FIG. 6 is a generalized flowchart 600 illustrating the pre-scan control routine as implemented by system processor 136 (FIG. 2) in accordance with an embodiment of the present invention. In general, the pre-scan control routine is a process with which system processor 136 determines whether disc drive 100 is ready to complete a first scan of the data sectors in media 106 for read errors. The pre-scan will only scan data sectors if certain criteria have been met. In one embodiment, commands issued from host computer 150 (FIG. 2) to complete an activity can not exist. In another embodiment, a predetermined amount of idle time (amount of time in which disc drive 100 was last active) has elapsed.

Upon system processor 136 "calling" the pre-scan control routine from the power-up routine (previously described in FIG. 3), the pre-scan control routine begins and proceeds to process block 602 and sets the first LBA of the pre-scan to an LBA of zero. Then the pre-scan control routine proceeds to decision block 604 to determine whether there are any issued commands from host computer 150. If a command or set of commands have been issued, the pre-scan control routine proceeds to process block 606 and system processor 136 processes the commands. If commands do not exist, then the pre-scan control routine proceeds to decision block 608 and system processor 136 determines whether the predetermined amount of idle time has elapsed. For example, the predetermined idle time can be 500 milliseconds. Those skilled in the art will recognize, however, that this value can be a wide range of values. The predetermined idle time can be a default value as well as user selectable. If the requisite amount of idle time has not elapsed, then the pre-scan control routine passes back to decision block 604 and system processor 136 determines whether any commands exist from host computer 150. If the requisite amount of idle time has elapsed, then the pre-scan control routine proceeds to process block 610 where system processor 136 performs or "calls" the pre-scan routine. The pre-scan routine is discussed below in further detail.

When the pre-scan routine ends, the pre-scan control routine proceeds to decision block 612 to determine whether the pre-scan routine has finished or if a fatal scan error has occurred. If either the pre-scan routine is finished or if a fatal error has occurred, then the pre-scan control routine terminates. For example, if a predetermined amount of consecutive unrecovered errors occur, such as ten consecutive unrecovered errors, then system processor 136 determines that a fatal error has occurred and pre-scan control routine will terminate. In another example, if a single occurrence of detected error is interpreted as severe hardware or system problems, such as the inability to seek, then a fatal error has occurred and will cause the pre-scan control routine to end. If no fatal errors have occurred and the pre-scan routine is not finished, then the pre-scan control routine passes back to decision block 604 to determine whether any commands exist. As shown in FIG. 6, the pre-scan control routine will terminate after the system processor 136 has pre-scanned the entire range of LBAs or if a fatal error occurs.

In general, the pre-scan routine is the first scan of the media upon power-up of disc drive 100. Referring to FIG. 5, the pre-scan routine begins in accordance with the BGMS routine. System processor 136 "calls" the pre-scan routine from the pre-scan control routine (described in FIG. 6), the pre-scan routine begins and proceeds to process block 502 of FIG. 5 to select the data sectors to be scanned. The pre-scan routine proceeds along flowchart 500 as described above until a command is issued from the host computer 150 in block 512. If the command issued by host computer 150 while pre-scan is in progress is a WRITE command, then the WRITE command is treated differently then a WRITE command issued during the BGMS routine.

Figure 7B:
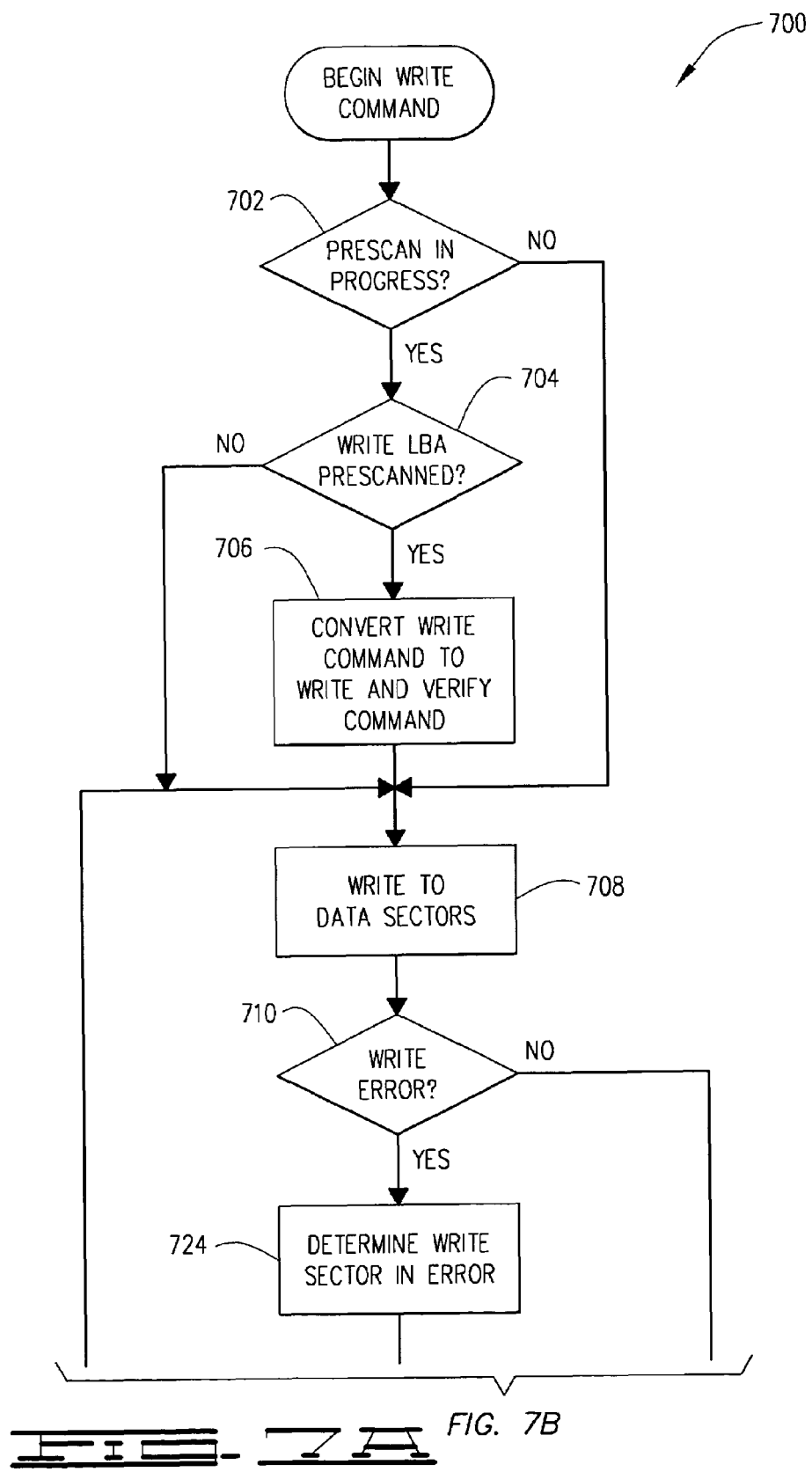
FIG. 7 is a flow chart of a write command routine in accordance with an embodiment of the present invention.
Figure 7B:
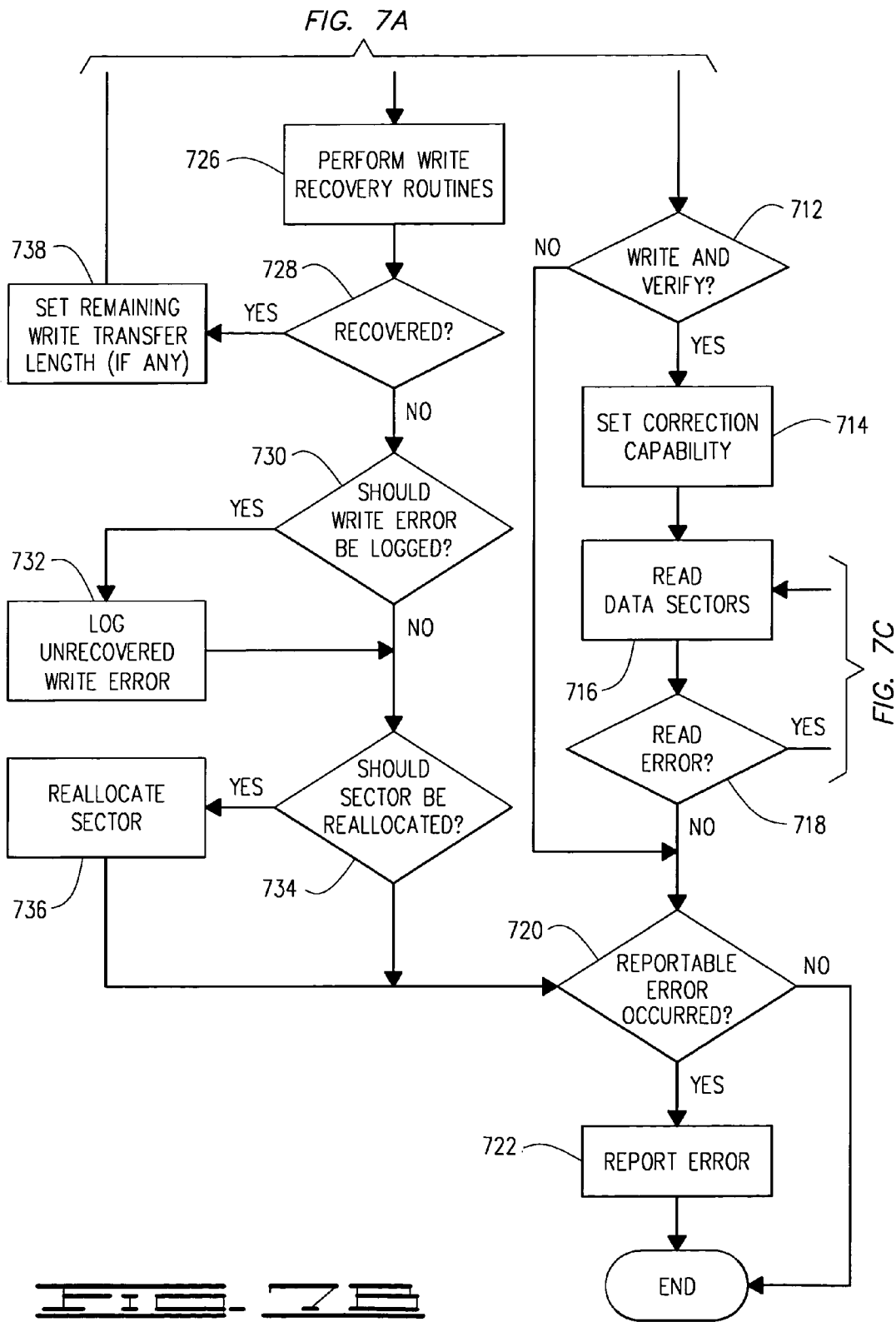

FIG. 7 is a generalized flowchart 700 of a write command routine in accordance with an embodiment of the present invention. Upon host computer 150 (FIG. 2) issuing a WRITE command during either the BGMS routine or the pre-scan routine, system processor 136 (FIG. 2) begins the write command routine and proceeds to decision block 702. At block 702, system processor 136 determines whether the pre-scan is in progress. Referring back to block 306 of FIG. 3, if the pre-scan is in progress, then the write command routine proceeds to decision block 704. Referring back to block 310 of FIG. 3, if progress of the pre-scan has been cleared, then the write command routine proceeds to process block 708. At block 704, system processor 136 determines whether the issued WRITE command is to a range of LBAs that have not yet been pre-scanned. If the range of LBAs have not been pre-scanned, then the write command routine proceeds to process block 706. If the LBA has been pre-scanned, then the write command routine proceeds to process block 708. At block 706, the WRITE command is converted to a WRITE AND VERIFY command. Converting the WRITE command to a WRITE AND VERIFY command will enhance the reliability of disc drive 100 as well as lower the amount of manufactured defective disc drives by avoiding unrecovered read or write errors of non-user data sectors.

Regardless of whether the WRITE command was converted to a WRITE AND VERIFY command, the write command routine proceeds to process block 708 and instructs read/write channel 144 (FIG. 2) to write to the data sectors as instructed by the issued write command. The write command routine proceeds to decision block 710 to determine whether a write error has occurred. If a write error occurred, then the write command routine proceeds to process block 724. If a write error did not occur, then the write command routine proceeds to decision block 712. At block 724, system processor 136 determines which written data sector has an error. Then, the write command routine proceeds to process block 726 and performs a write recovery operation by applying a series of corrective routines to the data sector with a write error. After the write command routine performs the write recovery operation, the write command routine proceeds to decision block 728 and determines if the write error has been recovered. If the write error is recovered, the write command routine proceeds to process block 738. If the write error is unrecovered, the write command routine proceeds to decision block 730.

At block 730, system processor 136 determines whether the unrecovered write error should be logged. Logging the unrecovered write error is user selectable. If the unrecovered error should be logged, then the write command routine proceeds to process block 732, logs the error and continues to decision block 734. If the unrecovered error should not be logged, then the write command routine proceeds to decision block 734. At block 734, system processor 136 determines whether the data sector should be reallocated. Unrecovered write errors can be reallocated if the user has activated automatic write reallocate enabled (AWRE). If AWRE is activated, the write command routine proceeds to block 736 and reallocates the data sector to a spare sector by utilizing temporary storage in buffer 146 (FIG. 2). Then, the write command routine proceeds to decision block 720. If AWRE is deactivated, the write command routine proceeds directly to block 720.

If the write error is recovered, the write command routine proceeds from block 728 to block 738. Since write errors are discovered as soon as they are written, the write command routine sets the remaining data sectors that still need writing at block 738 and then passes back to block 708 to write the remaining sectors.

Upon no write errors, write command routine proceeds to decision block 712 where system processor 136 determines whether the WRITE command has been converted to a WRITE AND VERIFY command. If the WRITE command has been converted, then the write command routine proceeds to process block 714. If the WRITE command has not been converted, then the write command routine proceeds to decision block 720. At block 714, system processor 136 sets the correction capability for data recovery. More specifically, system processor 136 sets the level at which a read error is detected. For example, the correction capability includes a defectiveness scale one to ten, with level ten being the most defective. System processor 136 will set the level of correction capability such that system processor 136 will detect defective sectors at the set level and above. Selection of correction capability can also be user selectable such that finding defective sectors sooner as well as marginally defective errors sooner is possible.

Next, the write command routine proceeds to process block 718 and instructs read/write channel 144 to read the selected data sectors. As read/write channel 144 is reading the selected data sectors, the write command routine proceeds to decision block 718 to determine if an error in reading has occurred during the read command. If a read error occurs, the write command routine proceeds to process block 740 to determine which data sector is in error. If a read error did not occur during the read of the selected sectors, the write command routine proceeds to decision block 720. If a read error occurs during the verify of the selected sectors, the scan will restart at the selected set of sectors after the error has been dealt with.

After system processor 136 determines the sector in error, the write command routine proceeds to process block 742 and performs a read recovery operation by applying a series of corrective routines in an attempt to recover the data sector in error. After the write command routine performs the read recovery operation, the write command routine proceeds to decision block 744 and determines if the read error has been recovered. If the read error is recovered, the write command routine proceeds to decision block 746. If the attempted recovery fails, the write command routine proceeds to process block 756 and logs the unrecovered read error. At block 746, system processor 136 determines whether the recovered read error should be logged. Logging the recovered read error is a function of the read recovery operation. If an amount of corrective routines applied to the recovered read error exceeds a threshold amount of routines, the write command routine proceeds to process block 748 and logs the recovered read error. If it took less than the threshold amount of routines to correct the error, the write command routine proceeds to decision block 750. After the recovered read error is logged and the unrecovered read error is logged, the write command routine also proceeds to decision block 750.

At block 750, system processor 136 determines whether the unrecovered or recovered read error should be reallocated. During the verify portion of the WRITE AND VERIFY command, recovered read errors can be reallocated if the user has activated AWRE. Unrecovered read errors can also be reallocated if the user has activated AWRE. If AWRE is activated for either type of error, the write command routine proceeds to block 752 to reallocate the data sector to a spare sector by utilizing temporary storage in buffer 146. Then, the write command routine proceeds to process block 754. If AWRE is deactivated for either type of error, then the write error is not reallocated and the write command routine proceeds directly to block 754.

Since read errors during the verify portion of the WRITE AND VERIFY command are discovered as soon as they are read, block 738 sets the remaining sector or sectors that still need verifying. The write command routine passes back to block 708 and reads the remaining sector(s).

If there are no write errors or read errors and if a write error is recovered, write command routine proceeds to decision block 720. At block 720, system processor 136 determines whether a reportable error occurred. If the write command completes without a write or read error the write command routine proceeds to terminate by sending a "good" status to host computer 150 through interface 148. If, however, the write command completes with a recoverable error the write command routine proceeds to process block 722 to report the error by sending an "error" status to host computer 150 through interface 148 (FIG. 2). Along with sending an "error" status, system processor 136 will also send additional information detailing the type of error before the write command routine terminates.

Access to information logged during the BGMS, the pre-scan and the WRITE command is user accessible. Upon user initiation, host computer 150 sends a LOG SENSE command to system processor 136. In response, system processor 136 sends host computer 150 log data as logged during the BGMS routine, the pre-scan routine and the write command routine. Upon user initiation, host computer sends a LOG SELECT command to system processor 136. In response, system processor 136 will erase the log area held in memory 137.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the method while maintaining substantially the same functionality without departing from the scope and spirit of the present invention. In addition, although the preferred embodiment described herein is directed to a storage system for recovering data, it will be appreciated by those skilled in the art that the teachings of the present invention can be applied to other systems without departing from the scope and spirit of the present invention.

What is claimed is:

1. A method of recovering data in a storage system that stores data in identifiable storage segments, the method comprising:
    scanning storage segments for read errors when the storage system is idle and performing at least one read recovery operation in an attempt to recover the read errors found during the scan;
    receiving a write command while the storage segments are being scanned;
    converting the write command to a write and verify command;
    writing data to at least one of the storage segments in accordance with the write portion of the write and verify command;
    verifying data written to the at least one storage segment in accordance with the verify portion of the write and verify command by:
        reading the data written to the at least one storage segment: and
        performing at least one read recovery operation on the data written to the at least one storage segment in an attempt to recover a read error from the data written.

2. The method of claim 1 and further comprising determining whether the storage system is ready to scan storage segments for read errors.

3. The method of claim 2, wherein determining whether the storage system is ready to scan storage segments for read errors further comprises determining whether a predetermined amount of interval time has elapsed since a last scan of the storage segments, wherein the predetermined interval is user selectable.

4. The method of claim 2, wherein determining whether the storage system is ready to scan the storage segments for read errors further comprises determining whether a predetermined amount of idle time has elapsed since the storage system was last active.

5. The method of claim 1, wherein step (a) further comprises setting a level of correction capability of read recovery such that the scanning can find marginally defective errors.

6. The method of claim 1, wherein step (b) further comprises disabling the scanning if a fatal error occurs.

7. The method of claim 1 and further comprising enabling the storage system to automatically reallocate selected storage segments having recovered and unrecovered read errors to spare storage segments.

8. The method of claim 1 and further comprising logging an occurrence of a recovered read error when scanning the storage segments for read errors if an amount of corrective routines to recover the read error exceeds a threshold amount of corrective routines and logging an occurrence of an unrecovered read error when scanning the storage segments for read errors if the attempt to recover the read error fails.

9. The method of claim 8, further comprising accessing the logging to view information related to recovered and unrecovered read errors.

10. The, method of claim 8, and further comprising erasing the logging such that there is additional space for logging of recovered and unrecovered read errors.

11. The method of claim 1, wherein the scanning of storage segments for read errors comprises a pre-scanning of the storage segments upon initial power-up of the storage system when the storage system is idle, wherein pre-scanning comprises a first scan of the storage segments.

12. The method of claim 11, wherein converting the write command to a write and verify command comprises converting the write command to a write and verify command when the write command is to one of the storage segments that has not undergone the pre-scanning.

13. The method of claim 1, further comprising:
    performing at least one write recovery operation on the data written to the at least one storage segment from the write command portion of the write and verify command in attempt to recover a write error; and
    logging an unrecovered write errors.

14. A storage system that stores data in storage segments comprises processing circuitry configured to:
    scan storage segments for read errors when the storage system is idle;
    perform at least one read recovery operation held in a memory of the processing circuitry in attempt to recover the read errors found during the scan;
    log an occurrence of a recovered read error found during the scan if an amount of corrective routines to recover the read error exceeds a threshold amount of corrective routines;
    receive a write command while the storage segments are being scanned:
    convert the write command to a write and verify command;
    write data to at least one of the storage segments in accordance with the write command;
    verify data written to the at least one storage segment in accordance with the verify command by:
        reading the data written to the at least one storage segment; and
        performing at least one read recovery operation on the data written to the at least one storage segment in an attempt to recover a read error.

15. The system of claim 14, wherein the scan of storage segments for read errors comprises a pre-scan of the storage segments upon initial power-up of the storage system when the storage system is idle, wherein the pre-scan includes a first scan of the storage segments.

16. The system of claim 14, wherein the processing circuitry is further configured to convert the write command to a write and verify command when the write command is to one of the storage segments that has not undergone the pre-scan.

17. The system of claim 14 and further comprising a buffer configured to temporarily store unrecovered errors and recovered errors until they can be automatically reallocated to spare storage segments.

18. The method of claim 14, wherein the processing circuitry is further configured to perform at least one write recovery operation on the data written to the at least on storage segment in attempt to recover a write error if a write error occurred when writing the data.

19. A method of recovering data in a storage system that stores data in identifiable storage segments, the method comprising:
    scanning storage segments for read errors when the storage system is idle;

receiving a write command while the storage segments are being scanned; and converting the write command to a write and verify command, the write and verify command instructs the storage system to:

write data to at least one of the storage segments;

verify the data written to the at least one storage segment by reading the data written; and perform at least one read recovery operation on the data written to the at least one storage segment in an attempt to recover an error found.

20. The method of claim 19, further comprising logging a recovered read error from the scanned storage segments if an amount of corrective routines to recover the read error exceeds a threshold amount of corrective routines.

21. The method of claim 19, wherein the write and verify command further instructs the storage system to perform at least one write recovery operation on the data written to the at least one storage segment in attempt to recover a write error if a write error occurred when writing the data.

* * * * *